Figure 1:
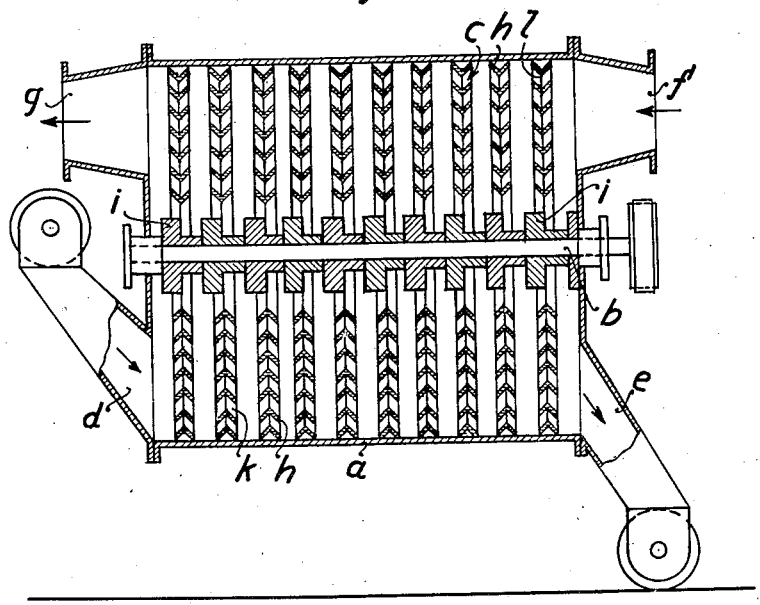

May 15, 1934.  L. HONIGMANN  1,958,666

DEVICE FOR DRYING AND ROASTING GRANULAR MATERIAL

Filed July 27, 1933

Inventor:
Ludwig Honigmann
per
Attorney.

Patented May 15, 1934

1,958,666

UNITED STATES PATENT OFFICE 1,958,666

DEVICE FOR DRYING AND ROASTING GRANULAR MATERIAL

Ludwig Honigmann, Aachen, Germany

Application July 27, 1933, Serial No. 682,526
In Germany August 3, 1932

4 Claims. (Cl. 257—6)

This invention relates to devices for drying or roasting fine grained material and has for its object to provide a new and improved construction of the heat exchange members employed in such devices.

The invention is especially adapted for use in continuously working devices comprising a container through which the heating medium and the material to be treated are passed in separate streams and in which are arranged throughout the length thereof and transverse to the direction of movement of the material a series of spaced heat exchange members generally in the form of perforated discs. These heat exchange members have imparted to them a circulatory or oscillatory movement transversely to the flow of the streams of material and heating medium and during this movement absorb heat from the heating medium and deliver it to the mass of material under treatment when traversing the same. The perforated heat exchange members cross the container in such a manner that the heating gases and the material are forced to pass through their perforations.

According to the invention, the disc-shaped heat exchange members are composed of concentric rings of section iron, such as L-iron, T-iron, U-iron, round iron, flat iron, curved iron or the like, leaving between each other annular passages for the gases and the material to be treated.

The heat exchange members constructed according to the invention possess large surfaces available for the transmission of the heat and large passages for the heating gases, these passages producing a frequent change of direction in the flow of the gases so that they are well utilized. With these members, there is attained an efficient and quick transmission of heat from the gases to the members and from the latter to the material under treatment. Owing to the large passages for the gases they do not penetrate into the material and therefore do not carry with them much dust.

Figure 2:
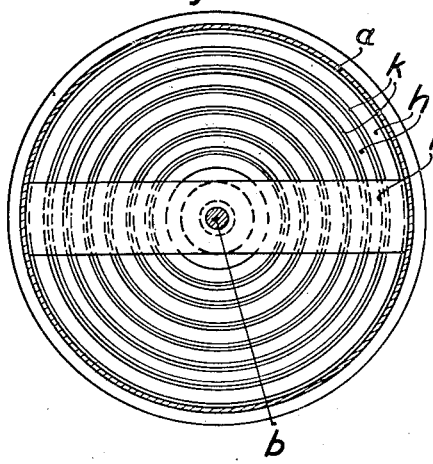

In the drawing:

Fig. 1 is a longitudinal section of a drying or roasting furnace with heat exchange members according to the invention, Fig. 2 is a cross section thereof, and Figs. 3 to 9 are cross sections of heat exchange members of various forms.

Referring to Figs. 1 and 2, $a$ is a cylinder through which extends a rotatable shaft $b$ carrying a series of spaced heat exchange members $c$ which have substantially the same diameter as the cylinder $a$. The cylinder has at its lower part in one of its head walls an entrance opening $d$ and in the other head wall a discharge opening $e$ for the material to be treated in the furnace. The material is preferably transported to and off the cylinder by means of screw conveyors. The cylinder head walls have in their upper part an inlet $f$ and an outlet $g$, respectively, for the heating gases.

I wish it to be understood that in accordance with the invention there may also be arranged in the container $a$ two or more parallel shafts with heat exchange members, in which case the members of each series are disposed in such a manner that the members of one series project between the members of the other series.

In the embodiment according to Figs. 1 and 2, each of the heat exchange members $c$ consists of a number of rings $h$ of angle iron. These rings are arranged in spaced relation concentrically about the axis of the shaft $b$ on a cross-bar $i$ which is fastened on the shaft $b$. The spaces $k$ between the rings $h$ form passages for the heating gases and the material to be dried.

The rings $h$ are formed so that the summit lines of the angles lie toward the shaft $b$ in the central plane of rotation of the discs and the right and left sides of the angles extend parallelly of each other. This arrangement of the rings allows the material to slip off them when the rings move through the mass of material.

Figures 3, 4, 5, 6, 7, 8, 9:
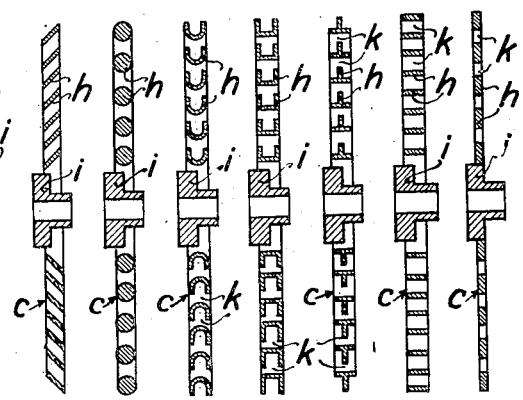

According to Fig. 3 the parallel rings $h$ consist of flat iron disposed obliquely to the plane of rotation of the disc. In Fig. 4 the rings $h$ are made of round iron, in Fig. 5 of iron with a curved section of U-shape, in Fig. 6 of channel-iron, in Fig. 7 of T-iron, in Fig. 8 of flat iron disposed at a right angle to the plane of rotation of the disc, and in Fig. 9 of flat iron disposed in the plane of rotation of the disc.

Having thus described my invention, what I claim as new and desire to secure by Letters-Patent is:—

1. A device for drying and roasting granular material, comprising a container through which to pass a stream of material to be treated and a stream of a heating medium separate from the former, disc-like perforated heat exchange members mounted for movement in the container transversely to the direction of flow of the said streams, each of these heat exchange members being composed of a plurality of spaced concentric rings of section iron.

2. A rotary disc-shaped heat exchange member for devices of the character described, comprising a plurality of interconnected spaced rings of section iron arranged in concentric parallel relation with their flat sides oblique to the plane of rotation of the member.

3. A rotary disc-shaped heat exchange member for devices of the character described, comprising a plurality of interconnected concentrically spaced rings of angle iron so disposed that the circular summit lines of the angles lie in the central plane of rotation of the member.

4. A rotary disc-shaped heat exchange member for devices of the character described, comprising a plurality of interconnected concentrically spaced rings of angle iron so disposed that the circular summit lines of the angles lie in the central plane of rotation of the member and are directed towards the axis of rotation thereof.

LUDWIG HONIGMANN.